United States Patent Office 3,614,892
Patented Oct. 26, 1971

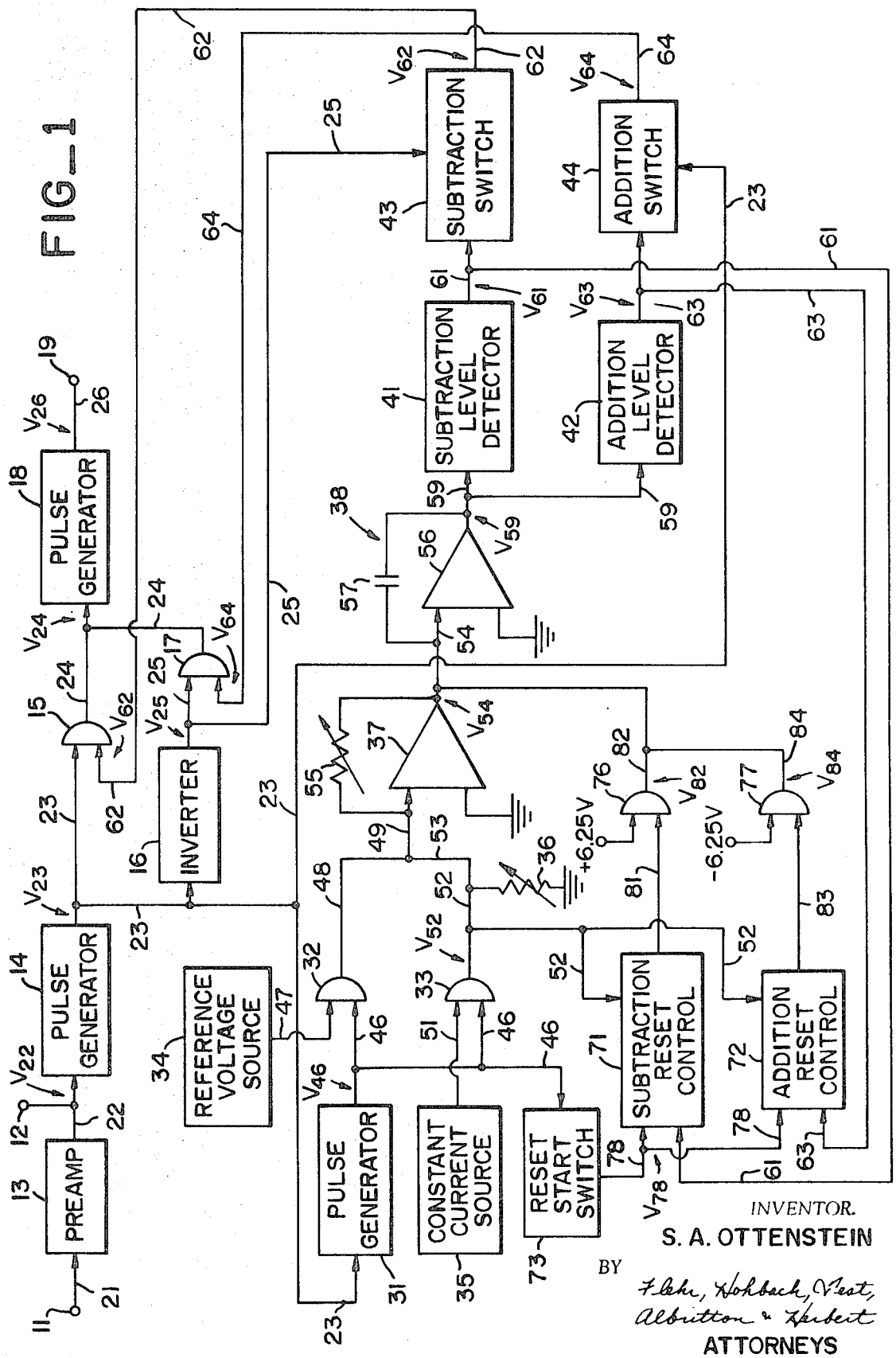

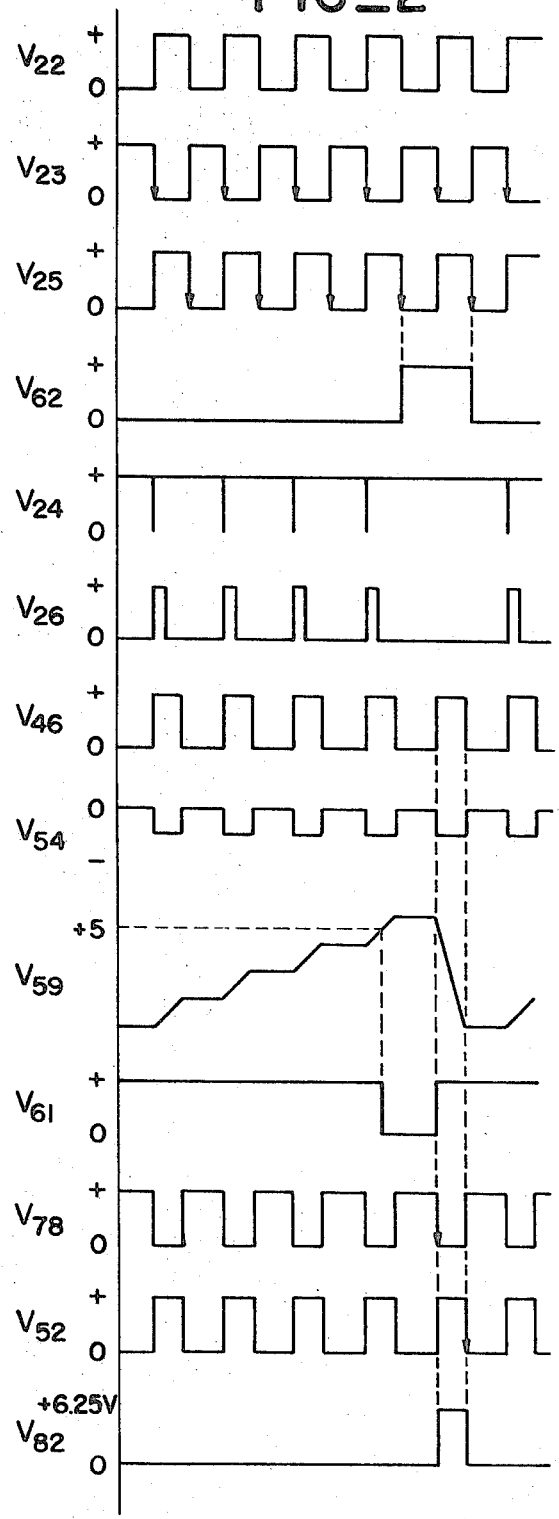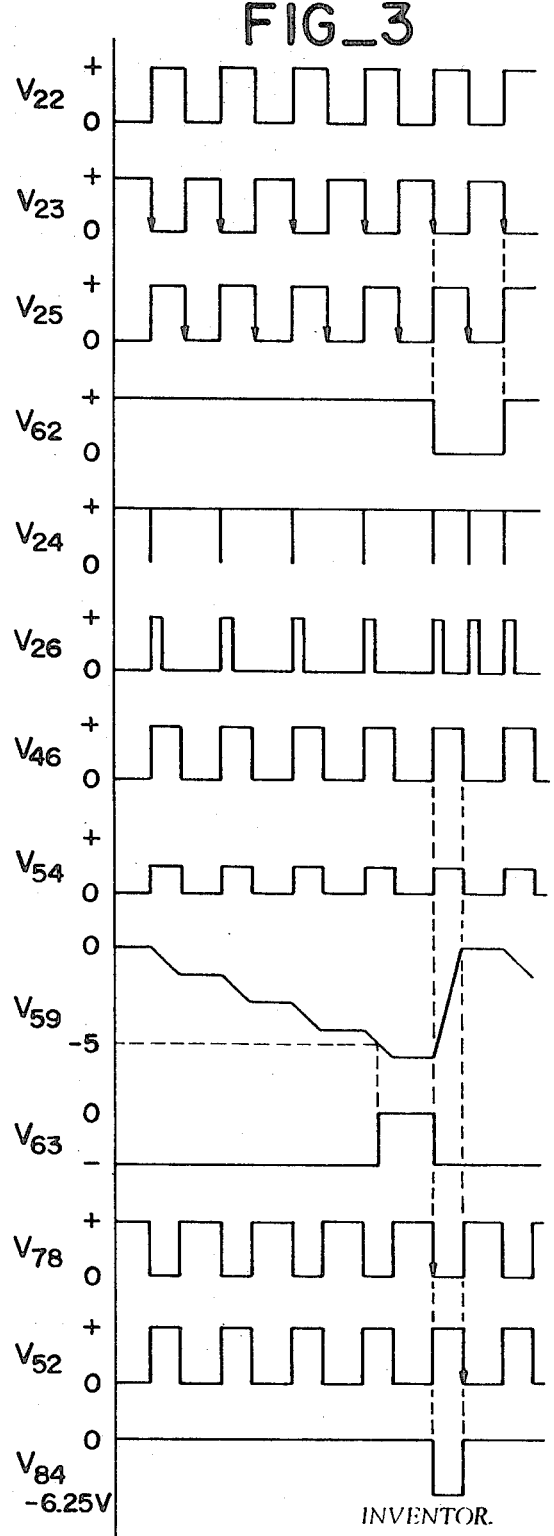

3,614,892
FLOWMETER TEMPERATURE COMPENSATION
SYSTEM AND METHOD
Sidney Allan Ottenstein, Summerville, N.J., assignor to
M & J Valve Company and M & J Development Company, both of Houston, Tex.
Filed Apr. 11, 1969, Ser. No. 815,313
Int. Cl. G01f 1/04
U.S. Cl. 73—233
16 Claims

ABSTRACT OF THE DISCLOSURE

System and method relating to liquid flowmeters for adding pulses to and subtracting pulses from the flowmeter's digital pulse train in accordance with temperature deviations from a reference temperature, volumetric flow rate, and the coefficient of expansion of the liquid. A signal having a magnitude proportional to the liquid temperature and a frequency dependent on the flow rate is generated and compared with a reference signal. The difference between the two signals is amplified, compensated in accordance with the coefficient of expansion of the liquid, and integrated to provide control of the addition and subtraction of pulses.

BACKGROUND OF THE INVENTION

Volumetric turbines and positive displacement flowmeters are widely used for measuring the volumetric flow of various liquids such as oil and other petroleum products in pipelines. These flowmeters generally include means for generating a train of pulses having a frequency dependent upon the movement of a turbine rotor or other sensing element interposed in the flowline. This pulse signal is monitored at a remote location where readout or registering means may be located.

One problem experienced with such flowmeters is that the volume of the liquid varies with changes in the temperature of the liquid, thereby introducing considerable inaccuracy into the measurements. Particular readings may be corrected by reference to temperature calibration charts, but this does not provide continuous correction.

Some attempts have heretofore been made at providing automatic and continuous temperature compensation in flowmeters of the above type. However, these attempts have not produced satisfactory results in terms of accuracy and/or reliability. There is, therefore, a need for a new and improved automatic and continuous compensation for such systems.

SUMMARY AND OBJECTS OF THE INVENTION

This invention pertains generally to flowmeters and more particularly to a temperature compensation system and method for flowmeters of the type in which volumetric liquid flow is represented by a train of pulses. The present invention is characterized by the addition or subtraction of pulses from the flow signal pulse train in accordance with temperature deviations from a reference temperature, volumetric flow rate, and the coefficient of expansion of the liquid. Means is included for generating a signal having a magnitude proportional to the temperature of the liquid and a frequency proportional to the flow rate, and for comparing this signal with a reference signal corresponding to the reference temperature. The difference between these two signals is amplified, compensated according to the coefficient of expansion of the liquid and integrated to provide accurate control of the addition and subtraction of pulses.

It is in general an object of the invention to provide a new and improved automatic and continuous temperature compensation system and method for flowmeters.

Another object of the invention is to provide a system and method of the above character in which pulses are added to and subtracted from the flow signal pulse train in accordance with liquid temperature deviations from a reference temperature.

Another object is to provide a system and method of the above character in which the difference between the liquid temperature and a reference temperature is amplified and integrated to provide accurate control of the addition and subtraction of pulses.

Another object of the invention is to provide a system and method of the above character which includes means for resetting the integrator to its initial condition each time a pulse is added to or subtracted from the pulse train.

Another object of the invention is to provide a system and method of the above character in which the rate at which pulses are added and subtracted is dependent on the volumetric flow rate of the liquid.

Another object of the invention is to provide a system and method of the above character which includes means for adjusting the rate at which pulses are added and subtracted in accordance with the coefficient of expansion of the liquid.

Another object of the invention is to provide a system and method of the above character which includes means for cancelling the effects of drift in the values of components used in the system.

Additional objects and features of the invention will be apparent from the following description in which the preferred embodiment is set forth in detail in conjunction with the accompanying drawing.

BRIEF DESCRIPTION OF THE DRAWING

FIG. 1 is a block diagram of a temperature compensation system embodying the present invention.

FIG. 2 illustrates the wave forms at various points in the system shown in FIG. 1 during the subtraction of pulses from the pulse train.

FIG. 3 illustrates the wave forms at various points in the system shown in FIG. 1 when pulses are to be added to the pulse train.

DESCRIPTION OF THE PREFERRED EMBODIMENT

For convenience of description, the preferred embodiment of the temperature compensation system can be thought of as comprising three separate sections: first, a gating section wherein pulses are added to and subtracted from the pulse train; second, a control section for controlling the addition and subtraction of pulses in accordance with the temperature, coefficient of expansion, and volumetric flow rate of the liquid; and, third, a reset section for resetting the control section to its original condition following each addition or subtraction of a pulse. Although these sections are described separately, it is to be understood that they are generally interconnected in the manner shown in FIG. 1.

The gating section includes input terminals 11 and 12, a pre-amplifier 13, a first pulse generator 14, a subtraction gate 15, an inverter stage 16, an addition gate 17, a second pulse generator 18, and an output terminal 19.

The input terminals 11 and 12 are adapted for receiving pulses from the uncompensated flow signal pulse train. The terminal 11 serves as a low level input and is connected to the input of the pre-amplifier 13 through a circuit 21. The output of the pre-amplifier is connected to a trigger input in the first pulse generator 14 through a circuit 22. The pre-amplifier is of conventional design and has a gain sufficient to increase the magnitude of the pulses at the input terminal 11 to the level required to trigger the pulse generator 14. The input terminal 12 is a high level input and is connected directly to the pulse generator trigger input through the circuit 22.

The pulse generator 14 can be any pulse generator or pulse shaper of conventional design which produces a square wave pulse at its output in response to each pulse received at its input. In the preferred embodiment, a Schmitt trigger is used for the first pulse generator. The output frequency of the pulse generator 14 is proportional to the flow of the liquid, but no temperature compensation has been made at this point.

The pulses from the first pulse generator 14 are delivered to a first input of the substraction gate 15 through a circuit 23. The gate 15 also includes a second input which can be referred to as a control input. This control input is connected to the control section of the system for receiving a temperature, flow rate and expansion coefficient dependent control signal in a manner hereinafter described in detail. The output of the subtraction gate 15 is connected to the input of the second pulse generator 18 through a circuit 24. The gate 15 is a logic gate of conventional design. It is normally open so that the train of pulses from the first pulse generator 14 passes directly to the input of the second pulse generator 18. Upon receipt of a control signal, the gate 15 closes, interrupting the passage of the pulse train, thereby subtracting one pulse from the train.

The output of the first pulse generator 14 is also connected through the circuit 23 to the input of the inverter stage 16. This stage is of conventional design, and its output is connected to a first input of the addition gate 17 through a circuit 25. The second, or control, input of the addition gate is connected to the control section for receiving a temperature, flow rate and expansion coefficient dependent control signal in a manner hereinafter described in detail. The output of the addition gate 17 is connected to the input of the second pulse generator 18 through the circuit 24. The gate 17 is a conventional logic gate, and it is normally closed. Upon receipt of a control signal this gate opens, passing one pulse from the inverter 16 to the input of the second pulse generator 18. This pulse is intermediate and in addition to the pulses received directly from the first pulse generator 14.

The pulse generator 18 can be a pulse generator or pulse shaper of conventional design. In the preferred embodiment, it is a monostable, or one-shot, multivibrator having a period on the order of 100 microseconds. This multivibrator is triggered by negative-going pulses. Thus, the negative-going edge of each of the pulses received from the pulse generator 14 and the inverter 16 produces a pulse at the output of the generator 18 having a width of 100 microseconds.

The output of the pulse generator 18 consists of a temperature compensated pulse train which is proportional to the fluid flow. This pulse train is delivered through a circuit 26 to the output terminal 19 for connection to readout and/or registering means as desired.

The control section includes a third pulse generator 31, gates 32 and 33, a reference voltage source 34, a constant current source 35, a temperature probe 36, a differential amplifier 37, a ramp generator 38, subtraction and addition level detectors 41 and 42, and subtraction and addition switches 43 and 44.

The third pulse generator 31 can be a conventional pulse generator or pulse shaper. In the preferred embodiment, it is a monostable, or one-shot, multivibrator having a period on the order of 300 microseconds. This pulse generator receives a trigger input through the circuit 23, and the state of the multivibrator is switched by the negative-going edge of each pulse from the first pulse generator 14. Thus, the output of the third pulse generator consists of an uncompensated pulse train derived from the flow signal.

The output of the pulse generator 31 is connected through a circuit 46 to the control input of the gate 32, which can be a conventional logic gate. This gate has a second input to which the reference voltage source is connected throug a circuit 47. In the preferred embodiment, the reference voltage is a negative voltage of 6.25 volts, which is chosen to correspond to a reference temperature of 60° F. This reference voltage is conveniently developed across a Zener diode, although other types of constant voltage sources can, of course, be used. The output of the gate 32 is connected to the input of the differential amplifier 37 through circuits 48 and 49. Thus, the reference voltage is applied to the input of the differential amplifier through the gate 32 in the form of a train of 300 microsecond pulses having a magnitude of −6.25 volts and a frequency corresponding to the volumetric flow rate of the liquid.

The output of the pulse generator 31 is also connected through the circuit 46 to the control input of the gate 33. This gate can likewise be a conventional logic gate having a second input to which the constant current source 35 is connected through a circuit 51. This current source is of conventional design, and in the preferred embodiment it provides a positive current of 7.8 milliampers. Thus, the output of the gate 33 is a train of 300 microsecond current pulses having a magnitude of 7.8 milliamperes and a frequency corresponding to the volumetric flow rate.

The output of the gate 33 is connected through a circuit 52 to the temperature probe 36. In the preferred embodiment, the temperature probe 36 is a resistance bulb thermometer which is in contact with the fluid in the pipeline. Thus, the resistance of this probe, and hence the magnitude of the voltage developed across the probe by the constant current pulses flowing through it, is dependent upon the temperature of the fluid. The voltage developed across the temperature probe is applied to the input terminal of the differential amplifier 37 through the circuits 53 and 49.

The differential amplifier 37 and the circuit 49 provide means for comparing the magnitude of the voltage developed across the temperature probe 36 with the magnitude of the reference voltage from the source 34. In the preferred embodiment, the values of the reference voltages, constant current, and temperature probe resistance are chosen to make the reference and temperature probe voltages opposite in polarity and equal in magnitude at the reference temperature of 60° F. At other temperatures, the voltages are still opposite in polarity, but their magnitudes are no longer equal. The magnitude and polarity of the difference between these two voltages corresponds to the magnitude and direction of the temperature deviation from the reference temperature.

In the preferred embodiment, the differential amplifier 37 comprises a conventional operational amplifier, with the temperature-flow rate dependent and reference voltages both connected to its inverting input terminal. Hence, the output of the differential amplifier is proportional in magnitude and opposite in polarity to the net voltage at the input terminal. If desired, other types of differential amplifiers can be used.

Means is provided for adjusting the rate at which pulses are added and substracted according to the thermal coefficient of expansion of the flowing liquid. This means includes a variable resistor 55 connected between the output and inverting input terminals of the differential amplifier 37. This resistor permits the gain of the amplifier 37 to be adjusted in accordance with the coefficient of expansion of the liquid.

The output of the differential amplifier 37 is connected through a circuit 54 to the ramp generator 38. In the preferred embodiment, the ramp generator is an integrator consisting of a conventional operational amplifier 56 having an integrating capacitor 57 connected between its inverting input terminal and its output terminal. The output of the ramp generator is a voltage ramp having a slope and polarity corresponding to the deviation from the reference temperature. Since the frequency of the pulses which are integrated to produce the voltage ramp is dependent on the flow rate of the fluid, the slope of the ramp also corresponds in part to the flow rate.

The output of the integrating ramp generator 38 is connected through circuit 59 to the subtraction and addition level detectors 41 and 42. These level detectors are conventional units which fire when the signals at their input terminals reach predetermined levels. In the preferred embodiment, the substraction level detector fires when the output of the ramp generator reaches a positive 5 volt level and the addition level detector 42 fires at a negative 5 volt level. The firing of each level detector causes it output voltages to jump from a high value to zero. The level detector outputs can be referred to as subtraction and addition commands, respectively.

The output of the subtraction level detector 41 is connected to the input of the subtraction switch 43 by a circuit 61. The subtraction switch also receives an input through the circuit 25 from the inverter stage 16. The switch includes a bistable multivibrator with a normally open switch gate connected in series with the input of the multivibrator. The signal from the inverter 16 is applied to the input of the multivibrator through the switch gate, and the conductivity of the gate is controlled by the subtraction command signal. The output of the multivibrator is connected through a circuit 62 to the control input of the subtraction gate 15.

The output of the addition level detector 42 is connected to an input of the addition switch 44 through a circuit 63. The addition switch also receives an input through the circuit 23 from the first pulse generator 14. The switch includes a bistable multivibrator with a normally open switch gate connected in series with the input of the multivibrator. The signal from the pulse generator 14 is applied to the input of the multivibrator through the switch gate, and the conductivity of the gate is controlled by the addition command signal. The ouput of the multivibrator is connected through a circuit 64 to the control input of the addition gate 17.

The reset section provides means for discharging the integrator capacitor 57 to reset the ramp generator 38 to its initial condition following the addition or subtraction of pulses in the gating section. This section includes a subtraction reset control 71, an addition reset control 72, a reset start switch 73, and gates 76 and 77.

The reset controls 71 and 72 each include a bistable multivibrator with a normally open switch gate connected in series with the input of the multivibrator. The switch gate in the subtraction reset control is connected through the circuit 61 to the output of the subtraction level detector 41 and adapted for closing upon receipt of the subtraction command signal. The switch gate in the addition reset control is connected through the circuit 63 to the output of the addition level detector and adapted for closing upon receipt of the addition command signal.

The reset control are connected for receiving a first input signal from the reset start switch 73 through a circuit 78 for initiating the reset action. The switch 73 is a conventional electronic switch which is controlled by the third pulse generator 31 through the circuit 46. The reset controls receive a second input signal from the gate 33 through the circuits 52 for terminating the reset action. This signal is likewise controlled by the third pulse generator 31, so that the duration of the reset action corresponds to the period of the pulse from the generator 31, i.e. 300 microseconds.

The output of the subtraction reset control 71 is connected through a circuit 81 to the control input of the gate 76, which is a conventional logic gate. The other input terminal of the gate is connected to a positive voltage of 6.25 volts, and the output is connected through a circuit 82 to the input terminal of the ramp generator 38. The gate 76 is normally closed.

The output of the addition reset control is connected through a circuit 83 to the control input of the gate 77. This gate is a conventional logic gate and is normally closed. The other input terminal of this gate is connected to a negative voltage of 6.25 volts, and the output of the gate is connected through a circuit 84 to the input terminal of the ramp generator 38.

Operation of the temperature compensation system can now be described as follows. Initially, let it be assmued that the temperature of the liquid is above the reference temperature of 60° F. The wave forms at various points in the system during this condition are illustrated in FIG. 2. Also, let it be assumed that the flow signal has been connected to the input terminals 11 and 12 so that the uncompensated pulse train $V_{22}$ is present in the circuit 22 at the input of the first pulse generator 14. The leading edge of each of the pulses in $V_{22}$ triggers the pulse generator 14 producing a train of negative-going pulses $V_{23}$ in the circuit 23. The pulse train 23 passes through the normally open subtraction gate 15 to the input of the second pulse generator 18. As is discussed hereinafter, when the liquid temperature is above the reference temperature, the subtraction gate 15 closes periodically to block the passage of the pulse train $V_{23}$, thereby effecting a subtraction of one pulse at a time from the train.

The pulse train $V_{23}$ is also applied to the inverter stage 16, from which it emerges as a train of positive-going pulses $V_{25}$. This inverted pulse train is applied to the input of the second pulse generator 18 through the addition gate 17. This gate remains closed as long as the liquid temperature is above the reference temperature, thereby blocking the inverted pulse train from the generator 18.

The wave form $V_{24}$ at the input of the second pulse generator 18 consists of the sum of the pulse train $V_{23}$ passing through the subtraction gate 15 and the inverted pulse train $V_{25}$ passing through the addition gate 17. Since the generator 18 is triggered by negative-going transtions, only the negative-going edges of the pulses in the train $V_{24}$ are illustrated in the drawig. The output of the pulse generator 18 is a pulse train $V_{26}$ which consists of one positive pulse for each of the negative transitions in the train $V_{24}$. It is to be noted that trains $V_{24}$ and $V_{26}$ are fully compensated, that is, they are proportional to the fluid flow as normalized to the reference temperature.

The leading, or negative-going, edges of the pulses in the train $V_{23}$ also trigger the third pulse generator 31, producing a train of 300 microsecond positive pulses $V_{46}$. The reference voltage source 34 and the constant current source 35 are gated by the 300 microsecond pulse train through the gates 32 and 33, respectively. In the preferred embodiment, the reference voltage is negative 6.25 volts, so the output of the gate 32 is a train of negative voltage pulses having a magnitude of $-6.25$ volts and a duration of 300 microseconds. The output of the gate 33 is a train of positive current pulses having a magnitude of 7.8 milliamperes and a duration of 300 microseconds. Since the resistance of the temperature probe 36 varies with temperature, the magnitude of the voltage pulses developed across the probe by the 7.8 milliampere current pulses is proportional to the fluid temperature. For temperatures above the 60° F. reference temperature, these pulses are of greater magnitude than the reference pulses, and the net voltage at the input of the differential amplifier 37 is a train of 300 microsecond positive pulses. These pulses are amplified and inverted in the differential amplifier, producing a train of negative 300 microsecond pulses $V_{54}$ in the circuit 54. As discussed hereinbefore, the gain of the amplifier 37 can be adjusted by means of the variable resistor 55 to compensate for the different thermal coefficients of expansion of different liquids. The amplitude of the pulse train $V_{54}$ includes this compensation in addition to being proportional to the temperature deviation from the reference temperature.

The pulse train $V_{54}$ is applied to the input of the integrating ramp generator 38 and produces a positive voltage ramp $V_{59}$ at the output of the ramp generator. When this ramp reaches a level of $+5$ volts, the subtraction level detector 41 fires. This firing causes the output voltage $V_{61}$ of the level detector to drop from a high positive value to zero. This voltage remains zero until the voltage ramp $V_{59}$ drops to less than 5 volts.

The negative going transition in the level detector output voltage $V_{61}$ closes the switch gate and the subtraction switch 43. With the switch gate closed, the next negative-going pulse in the train $V_{25}$ switches the state of the bistable multivibrator, switching its output voltage $V_{62}$ from zero to a high positive value. The next negative-going pulse in the train $V_{25}$ switches the multivibrator back to its original state and returns the voltage $V_{62}$ to zero.

The voltage $V_{62}$ controls the state of the subtraction gate 15. During the one pulse interval when the voltage $V_{62}$ is high, the subtraction gate is closed, thereby subtracting one pulse from the train $V_{23}$.

The negative-going transition in the subtraction level detector output voltage $V_{61}$ also closes the switch gate in the subtraction reset control 71. This allows the leading edge of the next pulse in the negative-going train $V_{78}$ from the reset start switch 73 to switch the state of the bistable multivibrator in the subtraction reset control. This multivibrator is switched back to its original state by the negative-going trailing edge of the next pulse in the positive train $V_{52}$. Since the trains $V_{78}$ and $V_{52}$ are both derived from the 300 microsecond pulse generator, the leading and trailing edges which trigger the multivibrator in the subtraction reset control are separated by by 300 microseconds. The output of the multivibrator controls the gate 76 to produce a positive 6.25 volt pulse $V_{82}$ having a duration of 300 microseconds. The pulse $V_{82}$ is applied to the input of the ramp generator 38 through the circuits 82 and 54 and discharges the integrating capacitor 57, resetting the ramp generator to its initial condition.

The wave forms for liquid temperature below the reference temperature of 60° F. are illustrated in FIG. 3. The operation of the system in this condition is very similar to that for temperatures above the reference temperature. With temperatures below the reference temperature, the voltage developed across the temperature probe 36 is smaller in magnitude than the reference voltage. Accordingly, the net voltage supplied to the input of the differential amplifier 37 is a train of negative voltage pulses, and the output voltage 54 is a train of positive voltage pulses. The pulses in each of these trains have a width of 300 microseconds.

With temperatures below the reference temperature, the output of the ramp generator 38 is a negative-going voltage ramp $V_{59}$. When the ramp reaches a level of $-5$ volts, the addition level detector 42 fires, and its output voltage $V_{63}$ goes from a high negative value to zero. The positive-going transition in the voltage $V_{63}$ closes the switch gate in the addition switch 44. This allows the next negative-going pulse from the pulse train $V_{23}$ to switch the state of the bistable multivibrator in the addition switch, causing its output voltage $V_{64}$ to go from a high positive value to zero.

The voltage $V_{64}$ controls the state of the addition gate 17. As long as this voltage is high, the gate remains closed. During the one pulse interval when the voltage $V_{64}$ is zero, the addition gate is open, allowing one pulse from the train $V_{25}$ to pass to the input of the third pulse generator 18. The subtraction gate 15 remains open at all times when the fluid temperature is below the reference temperature. Thus, the pulse from the addition gate 17 is added to the train of pulses $V_{23}$ passing through the subtraction gate 15. Because of the inverted relationship between the trains $V_{23}$ and $V_{25}$, the negative-going edge of this additional pulse falls intermediate the negative-going edges of the pulses in the train $V_{23}$. This relationship is clearly illustrated in the $V_{24}$ wave form shown in FIG. 3.

The positive-going transition of the addition level detector output voltage $V_{63}$ closes the switch gate in the addition reset control 72. This allows the next negative going edges of the pulses in the trains $V_{78}$ and $V_{52}$ to switch the state of the bistable multivibrator in the addition reset control in the same manner that they switch the multivibrator in the subtraction reset control. The output of the multivibrator in the addition reset control controls the gate 77, producing a negative 6.25 volt pulse $V_{84}$ having a duration of 300 microseconds. The pulse $V_{84}$ is applied to the input of the ramp generator 38 through the circuits 84 and 54. This pulse discharges the integrating capacitor 57, thereby resetting the ramp generator 38 to its initial condition.

Means is provided for cancelling effects of drift in the components used in the system. For example, the integrating capacitor 57 is used both in generator and in resetting the voltage ramp $V_{59}$. This capacitor is both charged and discharged on a constant current basis, thereby effectively cancelling any drift in the value of the capacitor.

Likewise, the 300 microsecond pulse generator 31 determines the width of the pulses which are integrated to generate the voltage ramp and the pulse which is used to reset the ramp. Thus, the effects of drift in the period of this generator are cancelled.

The effects of drift in the level detectors are likewise cancelled. Since the pulses $V_{82}$ and $V_{84}$ which reset the voltage ramp $V_{59}$ are of constant current and duration, the magnitude of the voltage reset is constant. In other words, the difference between the maximum and minimum levels of the voltage ramp remains the same regardless of the absolute values of these levels. Thus, the time required for generating the voltage ramp depends only on the temperature of the flowing liquid and not on the level at which the level detectors fire. Consequently, for any given liquid temperature, the period of the voltage ramp which determines the rate at which pulses are added and subtracted remains fixed, regardless of drift in the level detectors.

It is apparent from the forepoing that a new and improved temperature compensation system and method for flowmeters has been provided. While only the presently preferred embodiment has been described herein, it will be apparent to those familiar with the art that certain changes and modifications can be made without departing from the scope of the invention as defined by the following claims.

I claim:

1. In a method for normalizing the pulse train output from a flowmeter to a predetermined reference temperature to compensate for temperature changes in a liquid having its volumetric flow rate measured by the flowmeter, the steps of generating an electrical temperature signal having a magnitude proportional to the temperature of the liquid and a frequency corresponding to the volumetric flow of said liquid, said temperature signal being distinct from the pulse train output from the flowmeter, electronically comparing said temperature signal with a reference signal having the same frequency as the temperature signal and a magnitude corresponding to said reference temperature, integrating the difference between the magnitudes of said temperature and reference signals in an integrator to provide a voltage ramp, substracting one pulse from said pulse train each time said voltage ramp reaches a first predetermined level adding one pulse to said pulse train each time said voltage ramp reaches a second predetermined level, and resetting said voltage ramp to its initial level each time a pulse is added to or subtracted from said pulse train.

2. A method as in claim 1 wherein said temperature signal is generated by disposing a temperature dependent resistive element in said liquid and intermittently passing an electric current of constant magnitude through said resistive element at a rate corresponding to the volumetric flow rate of the liquid.

3. A method as in claim 1 together with the additional step of amplifying the difference between the temperature and reference signals before integrating by an amount corresponding to the thermal coefficient of expansion of the liquid.

4. In a flow metering system wherein the volumetric flow of a liquid is represented by a pulse train having a frequency corresponding to the flow rate of the liquid, an input terminal adapted for receiving pulses from said pulse train, a first pulse generator connected to said input terminal for generating one pulse in response to each of the pulses received at said input terminal, each pulse generated including one transition of a predetermined polarity, a second pulse generator adapted for generating pulses of a predetermined duration in response to transitions of said predetermined polarity, normally open gate means connected in a signal conducting path between the first and second pulse generators for passing pulses from said first pulse generator to said second pulse generator, said gate means being adapted for being closed by a subtraction control signal to interrupt the passage of pulses from said first to said second pulse generator, an inverter and normally closed gate means connected in series between said first and second pulse generators and in parallel with said normally open gate means, said inverter serving to invert the output of said first pulse generator to produce pulses having transitions of said predetermined polarity intermediate the transitions of said polarity in the output of said first pulse generator, said normally closed gate means being adapted for being opened by an addition control signal to pass pulses from said inverter to said second pulse generator, and temperature responsive control means connected to the normally open and normally closed gate means for monitoring the temperature of the liquid and supplying addition and subtraction control signals to said gate means to control the output of said second pulse generator in accordance with the temperature of said liquid.

5. A flow metering system as in claim 4 wherein said control means includes a third pulse generator connected to said first pulse generator and adapted for generating one pulse of a second predetermined duration in response to each pulse from said first pulse generator, a temperature probe disposed in said liquid, said probe having an electrical resistance varying in accordance with the temperature of said liquid, a constant current source gated by said third pulse generator and connected to said temperature probe and to the input of a differential amplifier, a reference voltage source gated by said third pulse generator and connected to the input of said differential amplifier, an integrating ramp generator connected to the output of said differential amplifier for generating a voltage ramp having a level and polarity dependent on the flow rate of said liquid and on the difference between said reference voltage and the voltage developed across said temperature probe, and level detector and switching means connected to said ramp generator and to said normally open and normally closed gate means for delivering an addition control signal to said normally closed gate means when said voltage ramp reaches a predetermined level of one polarity and delivering a subtraction control signal to said normally open gate means when said voltage ramp reaches a predetermined level of opposite polarity.

6. A flow metering system as in claim 5 together with variable resistive means connected between the output and input of said differential amplifier for adjusting the gain of said amplifier according to the coefficient of expansion of said liquid.

7. A flow metering system as in claim 5 together with resetting means connected to said ramp generator for applying a pulse to said generator to reset said generator to its initial condition each time a control signal is delivered to the normally open and normally closed gate means.

8. A flow metering system as in claim 7 wherein said ramp generator comprises an operational amplifier having an integrating capacitor connected between its inverting input terminal and its output terminal, said capacitor being charged during the generation of said voltage ramp and discharged during the resetting of said generator, thereby cancelling the effects of drift in the value of said capacitor.

9. A flow metering system as in claim 7 together with means connecting said third pulse generator to said resetting means in such manner that the duration of the voltage pulse applied to the ramp generator is equal in duration to the pulses from said third generator which gates the constant current and reference voltage sources during the generation of the voltage ramp, thereby cancelling the effects of drift in the period of said third pulse generator.

10. A flow metering system as in claim 7 wherein said resetting means includes means for applying a resetting pulse of constant current and duration to said ramp generator for resetting said generator by a fixed amount independent of the absolute value of the maximum level of said voltage ramp, thereby cancelling the effects of drift in the firing level of the level detector means.

11. In a temperature compensating system for normalizing the pulse train output of a flowmeter to a predetermined reference temperature, said pulse train having a frequency corresponding to the volumetric flow rate of a liquid passing through the flowmeter, an input terminal, an output terminal, circuit means operationally interconnecting the input and output terminals to provide a path for passing said pulse train from said input terminal to said output terminal, said circuit means including normally open gating means disposed in said path, said gating means being adapted for being closed by a subtraction control signal to block the passage of said pulse train to said output terminal, thereby subtracting pulses from said pulse train, said circuit means also including normally closed gating means connected to an auxiliary source of pulses and to the output of said normally open gating means, said normally closed gating means being adapted for being opened by an addition control signal to introduce pulses from said auxiliary source into said path, thereby adding pulses to said pulse train, a temperature sensitive probe monitoring the temperature of the liquid, means connected to said probe for generating a temperature signal distinct from the pulse train, said temperature signal having a magnitude corresponding to the temperature of the liquid and a frequency corresponding to the flow rate of said liquid, means for generating a reference signal having a magnitude corresponding to the reference temperature and a frequency corresponding to the flow rate of the liquid, means for comparing the magnitudes of said temperature and reference signals and generating a ramp signal corresponding to the frequency of said signals and the difference in magnitude between them, and means responsive to the ramp signal for applying a subtraction control signal to said normally open gating means when said ramp signal reaches a first predetermined level and applying an addition control signal to said normally closed gating means when said ramp reaches a second predetermined level.

12. A temperature compensation system as in claim 11 wherein the means for comparing and generating includes a differential amplifier connected for receiving the reference signal and the signal generated by the means connected to said probe, together with a ramp generator connected to the output of said differential amplifier, and wherein said means responsive to the ramp signal includes a level detector and switching means connected to the output of said ramp generator and to the normally open and normally closed gating means.

13. A temperature compensation system as in claim 12 together with resetting means for delivering a pulse derived from said uncompensated pulse train to said ramp generator for resetting said ramp generator to its initial condition each time a pulse is added to or subtracted from said pulse train.

14. A temperature compensation system as in claim 12 wherein said differential amplifier includes means for compensating the difference in magnitude between the signal from said temperature probe and the reference signal by an amount corresponding to the coefficient of expansion of the liquid.

15. In a method for normalizing a flowmeter pulse train to a predetermined reference temperature to compensate for temperature changes in a flowing liquid, the steps of generating an electrical temperature signal corresponding to the volumetric flow rate and temperature of the liquid, comparing said temperature signal with a reference signal corresponding to the volumelaic flow rate and to the reference temperature to ascertain the temperature of the liquid relative to the reference temperature, adding pulses to the flowmeter pulse train when the liquid temperature is below the reference temperature, and subtracting pulses from the pulse train when the liquid temperature is above the reference temperature.

16. A method as in claim 15 wherein the pulses added to the pulse train when the liquid temperature is below the reference temperature are derived from the pulse train.

References Cited

UNITED STATES PATENTS 3,176,514    4/1965    Foster _____ 73—229

FOREIGN PATENTS 1,491,099    6/1967    France _____ 73—233

RICHARD C. GUEISSER, Primary Examiner

M. SMOLLAR, Assistant Examiner

U.S. Cl. X.R.

73—194 (E), 231 (R); 235—151.34